US007278041B2

(12) United States Patent
Piel et al.

(10) Patent No.: US 7,278,041 B2
(45) Date of Patent: Oct. 2, 2007

(54) DATA PROCESSING SYSTEM AND METHOD

(75) Inventors: Vincent Piel, Grenoble (FR); Alain Vandenbergh, Echirolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 818 days.

(21) Appl. No.: 10/405,474

(22) Filed: Apr. 3, 2003

(65) Prior Publication Data

US 2003/0229806 A1    Dec. 11, 2003

(30) Foreign Application Priority Data

Apr. 3, 2002    (EP) .................................. 02354054

(51) Int. Cl.
*G06F 1/00* (2006.01)
(52) U.S. Cl. ............................ 713/330; 713/1; 713/200
(58) Field of Classification Search ................ 713/200, 713/1
See application file for complete search history.

(56) References Cited

U.S. PATENT DOCUMENTS

| 4,712,196 | A |   | 12/1987 | Uesugi |  |
|-----------|---|---|---------|--------|--|
| 5,630,142 | A |   | 5/1997  | Crump et al. |  |
| 5,754,798 | A | * | 5/1998  | Uehara et al. ............... 710/104 |
| 5,978,923 | A | * | 11/1999 | Kou ............................ 713/323 |
| 6,006,335 | A | * | 12/1999 | Choi et al. ................... 713/310 |
| 6,219,229 | B1 | * | 4/2001 | Lee ............................ 361/683 |
| 6,684,338 | B1 | * | 1/2004 | Koo ............................ 713/300 |
| 6,745,330 | B1 | * | 6/2004 | Maillot ........................ 726/35 |
| 6,789,206 | B1 | * | 9/2004 | Wierzbicki et al. ......... 713/300 |
| 6,847,367 | B1 | * | 1/2005 | von Alten et al. .......... 345/530 |
| 6,892,263 | B1 | * | 5/2005 | Robertson ................... 710/301 |
| 2005/0268184 | A1 | * | 12/2005 | Hou et al. .................. 714/712 |

FOREIGN PATENT DOCUMENTS

EP             0901062 A1        3/1999

* cited by examiner

*Primary Examiner*—Chun Cao
*Assistant Examiner*—Vincent T Tran

(57) ABSTRACT

The present invention relates to a data processing system and method in which an indicator is used to provide an indication of whether or not it is safe to maintain the data processing system. Often, the first action taken by maintenance personnel, when maintaining a data processing system, is to remove the power to that system. This renders ineffective any means for providing an indication of the state of the data processing system that is dependent upon power such as, for example, the conventional motherboard power LED. Suitably, the present invention provides an indication of whether or not it is safe to maintain the system, even in the absence of power being connected to the system, using, in preferred embodiments, a bi-stable LCD, which retains its state in the absence of power.

13 Claims, 2 Drawing Sheets

DATA PROCESSING SYSTEM AND METHOD

FIELD OF THE INVENTION

The present invention relates to a data processing system and method and, more particularly, to a data processing system and method which provides an indication of whether the system is able to be upgraded or modified.

BACKGROUND TO THE INVENTION

Within today's energy conscious society, manufacturers of computers are constantly striving for ways of producing more energy efficient computers. Efforts within the computing industry to achieve this aim manifest themselves in the form of computers that comply with the Advanced Configuration and Power Interface specification, revision 2.0, Jul. 27, 2000, together with its errata. This specification defines a number of reduced power, or sleep, modes during which the computer system, rather than being mechanically turned off, assumes a state in which the power consumption is reduced as compared to the conventional working mode, S0. The ACPI specification defines six such modes, each having a respective level of power consumption. The six modes include the working mode, S0, first, second, third and fourth sleep modes, S1, S2, S3 and S4, and a clean shut-down mode, S5.

During, for example, the S4 mode, also know as the hibernate mode, the power consumption of the computer system is minimal and only marginally greater than when the computer system has been completely switched off as in the S5 mode. During the hibernate mode there is no outward indication that the computer system is in that mode. This presents a significant problem for maintenance personnel during maintenance of the computer system. For safety reasons, maintenance personnel often, as a first course of action, remove the power supply to the computer system to remove the risk of electric shock. The maintenance personnel then usually open the case of the computer and perform whatever upgrades or modifications are necessary. The upgrades may include, for example, adding additional memory, removing and replacing malfunctioning memory or other malfunctioning components. Changing, for example, a video card, will normally cause the computer system to crash upon power up if this change has been made during a sleep mode. This is due to the system awaking from, for example, the S4 mode, loading the hiberfil.sys file and assuming operations in the conventional manner without having taken into account the hardware changes, that is, there is no way the system can be informed of such hardware changes while it is in one of the sleep modes.

Prior solutions have attempted to solve this problem by ensuring the operating system can detect the hardware change and then to ask the user to choose between the operating system attempting to catch up with the hardware change, that is, to attempt to take the change into account and resume normal operation, or to restart the computer, which will entail losing the working environment including any documents and data associated with applications that were open immediately prior to entering the S4 sleep mode. It is often the case, for the first option, that the operating system will fail to take the hardware change into account and that the second option is unacceptable.

It is an object of the present invention at least to mitigate some of the problems of the prior art.

SUMMARY OF THE INVENTION

Accordingly, a first aspect of the present invention provides a data processing system comprising an indicator capable of having a state that provides an indication of whether or not it is safe to perform maintenance on the data processing system; the indicator being arranged to retain the state in the absence of power being supplied to the data processing system; and a controller arranged to set the state of the indicator according to whether or not it is safe to perform maintenance on the data processing system.

Suitably, even in the absence of power, as is conventional when hardware personnel maintain computer systems, the computer system can provide a visible indication of whether or not it is safe to maintain the hardware. The indication may include, for example, an indication of the current sleep mode of the computer. The term "visible" within preferred embodiments of the present invention includes being visible to the human eye by merely observing the indicator and without having to supply power to the computer system or the indicator. This should be contrasted with visible in the sense of being discoverable after interrogation using software, having suitably powered up the computer system.

In preferred embodiments, if the indicator shows that it is acceptable to proceed with hardware maintenance, the maintenance personnel can continue as usual. However, if the indicator shows that it would be unsafe to implement hardware maintenance, the maintenance personnel can reboot the machine, which will recover and restore the system context from the hibernation file, and then perform a clean shutdown, that is, enter the S5 state. After performing a clean shutdown, the computer system will be safe to maintain.

In preferred embodiments the indicator comprises at least two stable states in the absence of power. One of the stable states indicates that it is safe to maintain the computer system and the other state indicates that it is unsafe to maintain the computer system.

Preferred embodiments of the present invention comprise a data processing system having a power management system, which is arranged, upon entering a reduced power mode of operation, to influence the state of the indicator.

In preferred embodiments, the controller comprises at least one of a BIOS function and a power management control method.

Following a reboot from a clean shutdown or a power-up, there will come a point in the processing where, should the computer system enter a reduced power mode, it will be unsafe to maintain the computer system without performing a further clean shutdown and reboot. Suitably, preferred embodiments are arranged such that the controller, or BIOS, is operable to influence the state of the indicator after completion of a predetermined routine or process. Preferably, the predetermined routine or process is the Power-On Self-Test.

A second aspect of the present invention provides a method for maintaining a data processing system the method comprising the steps of determining from the indicator that it is unsafe to maintain the data processing system; powering up the data processing system; and performing a clean shut-down of the data processing system before commencing any such maintenance.

By ensuring that a clean shutdown has been performed, the maintenance personnel are at liberty to effect any changes in hardware without running the risk of losing user data or of the system crashing following such changes.

BRIEF DESCRIPTION OF THE DRAWINGS

Embodiments of the present invention will now be described, by way of example only, with reference to the accompanying drawings in which.

DESCRIPTION OF PREFERRED EMBODIMENTS

Figure 1:
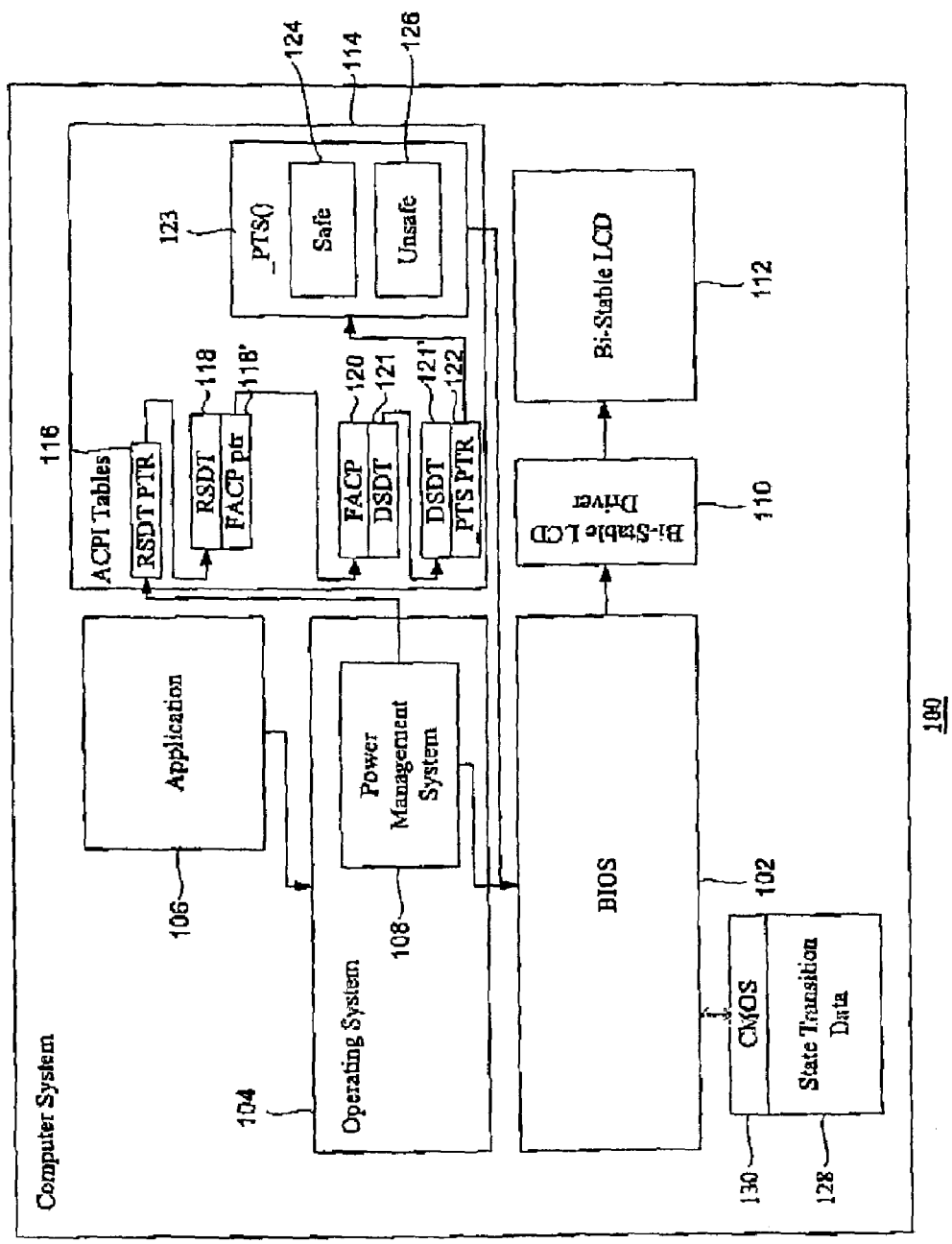
FIG. 1 shows a computer system according to an embodiment.

Referring to FIG. 1, there is shown a computer system 100. The computer system 100 comprises a BIOS 102 and an operating system 104. The operating system 104 allows a user to run various applications such as application 106. The operating system 104 has a power management system 108 that, in preferred embodiments, implements an ACPI compliant power management policy for the computer system 100.

The computer system 100 also comprises an LCD driver 110 that is arranged to drive a bi-stable LCD 112. The bi-stable LCD 112 is arranged so that it has at least one stable state even in the absence of power being applied to the computer system 100 or, more particularly, to the bi-stable LCD 112. Such an LCD is available, for example, from Nemoptic, 1, rue Guynemer—78114 Magny-les-hameaux—France. Nemoptic produce a bi-stable nematic LCD, which retains its state in the absence of power. The BIOS 102, bi-stable LCD driver 110 and bi-stable LCD 112 are used to provide an indication to maintenance personnel of whether or not it is safe to maintain the computer system 100. It will be appreciated, even in the absence of power, which often occurs when maintenance personnel maintain computer systems, that the maintenance personnel will be able to determine whether it is safe or unsafe to maintain the computer system 100 according to the message displayed by, or the state of, the bi-stable LCD 112.

If the bi-stable LCD 112 shows that it is safe to maintain the computer system 100, the maintenance personnel can continue as usual. However, if the bi-stable LCD 112 shows that it is unsafe to maintain the computer system 100, the maintenance personnel should preferably perform a clean shutdown, after which it will then be safe to maintain the computer system.

In a preferred embodiment, the power management system 108 uses a number of ACPI tables and control methods 114 to modify the state of the bi-stable LCD 112. The ACPI tables 114 are located using the conventional Root System Description Table Pointer 116. The Root System Description Table Pointer 116, as is conventional, points to a Root System Description Table 118. The Root System Description Table 118 has a number of entries such as, for example, a FACP pointer 118', which points to a conventional FACP table 120, the latter having an entry 121, DSDT, for locating the differentiated system Description Table 121'. The DSDT 121' contains a pointer, _PTS PTR 122, which points to a prepare-to-sleep "_PTS()" control method 123. The _PTS control method 123 has a pair of routines 124 and 126 that are used to change the state of the bi-stable LCD 112 to indicate that it is safe or unsafe, respectively, to maintain the computer system 100.

The operating system 104 or, more particularly, the power management system 108, upon entering any state ensures that the last action, or one of the last actions, performed by the computer system 100 immediately prior to entering such a state is to locate the _PTS() control method 123 and to invoke one of the routines 124 and 126 associated with that control method 123.

The first routine 124 is arranged to ensure that the BIOS 102 and bi-stable LCD driver 110 are used to set the bi-stable LCD 112 to indicate that it is safe to maintain the computer system too. The second routine 126 is arranged to ensure that the BIOS 102 sad bi-stable LCD driver 110 set the state of the bi-stable LCD 112 to indicate that it is unsafe to maintain the computer systems.

Figure 2:
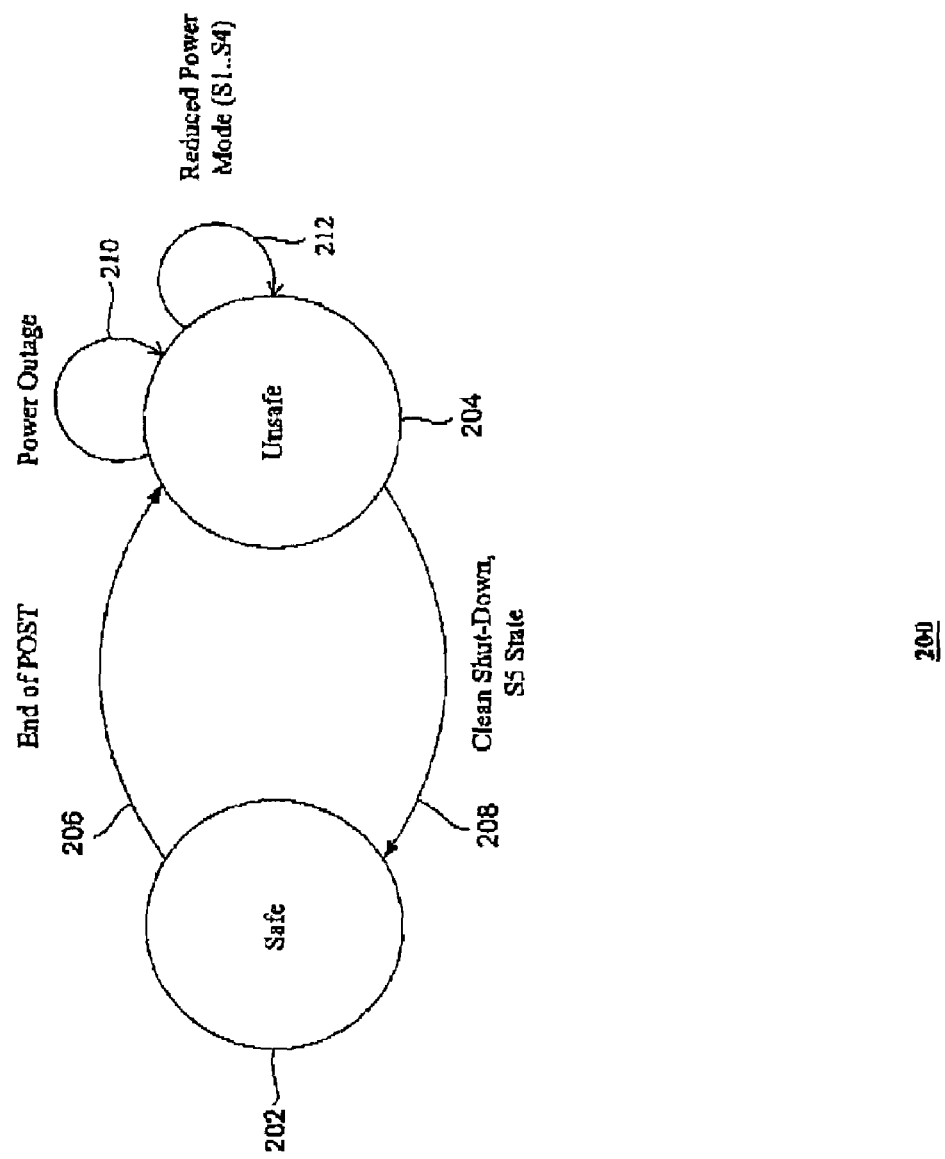
FIG. 2 depicts a state transition diagram according to an embodiment.

State transition data 128, representing states of a state transition diagram, the latter being described with reference to FIG. 2, provides an indication of whether or not the computer system 100 is in a state in which is safe to perform hardware maintenance. The data 128 representing the current state of the computer is stored within a CMOS memory 130 that is accessible by the BIOS 102. The CMOS memory 130 has its own power supply and is operable as a non-volatile memory, in the sense that the context of the CMOS memory 130 is not lost when the conventional power supply to the computer system 100 has been removed.

Referring to FIG. 2, there is shown a state diagram 200. The state diagram 200 has two states; namely, a safe state 202 and an unsafe state 204. The state diagram 200 is used by the power management system 108 to determine the appropriate routine 124 or 126 of the _PTS control method 123 to be called upon entry into a reduced power consumption state, S1 to S5.

The state transition diagram 200 has two transitions. A first transition 206 occurs at the end of the conventional Power-On Self Test. This transition 206 is used to move the computer system 100 from the safe state 202 to the unsafe state 204. The power management system 108, upon detecting the End of Power-On Self Test transition 206, invokes the second routine 126 to change the state of the bi-stable LCD 112 to indicate that it is unsafe to maintain the computer system. A clean shut-down, or S5 state, transition 208 is also provided. This transition 208 is used to provide an indication to the power management system 109 that the computer system is undergoing a clean shutdown and that the first routine 124 should be invoked to ensure that the state of the bi-stable LCD 112 is changed to indicate that it is safe to maintain the computer system 100.

It will be appreciated that there may be numerous other transitions that lead from and to the unsafe state 204. These transitions include, for example, a power outage transition 210 and a reduced power mode transition 212. In reality there will be for each of the reduced power modes S1 to S4 a corresponding transition from the unsafe state 204 back to the unsafe state 204.

Although the above embodiment has been described with reference to a computing system, embodiments of the present invention are not limited to such a system. Embodiments of the present invention may find application in any electrical or electronic system that has a reduced power mode. More particularly, embodiments of the present invention may be realised within electrical or electronic systems that have both a reduced power mode and some form of saved status or historical data that provides information on the configuration or state of the system immediately prior to entering a reduced power mode. For example, a printer or facsimile may be upgraded to include more memory. These machines invariably have reduced power modes. If effect is given to an upgrade such as, for example, increasing the memory capacity of the system, without the system having been correctly shutdown or turned off, upon awaking from the sleep mode, the additional memory may not be recognised and the system may malfunction. Alternatively, or additionally, data may be lost, particularly in the case of a facsimile machine.

Although the above embodiment uses the _PTS() control method 123 to access the functions that change the stain of the indicator 112, embodiments of the present invention are not limited to such an arrangement. The functions may be accessed in some other manner. For example, if the optional _GTS() control method (not shown) is implemented by the ACPI compliant computer system 100, this control method could be used as an alternative to the _PTS() control method 123. Still further, although the _PTS() and _GTS() control methods have been described with reference to being accessed via the DSDT table other ACPI tables, such as, for example, SSDT and PSDT, could equally well be used to access the _PTS() or _GTS() control methods.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data processing system comprising:
    an indicator that provides an indication of whether or not it is safe to perform maintenance on the data processing system; the indicator being arranged to retain the state in the absence of power being supplied in the data processing system; and
    a controller arranged to set the state of the indicator according to whether or not it is safe to perform maintenance on the data processing system,
    wherein the state provides an indication as to whether or not it is safe to maintain the data processing system, and
    wherein all possible states corresponding to when power is being supplied to the data processing system are indicated as unsafe states for maintaining the data processing system.

2. A data processing system as claimed in claim 1, wherein the indicator comprises at least two stable stages in the absence of power.

3. A data processing system as claimed in claim 1, wherein the data processing system comprises a power management system; the power management system being arranged, in preparing to enter a reduced power mode of operation, to influence the state of the indicator.

4. A data processing system as claimed in claim 3, further comprising:
    a first routine that is used by the power management system to set the state of the indicator to indicate a safe state; and
    a second routine that is used by the power management system to set the state of the indicator to indicate an unsafe state.

5. A data processing system as claimed in claim 4, wherein the power management system is configured to invoking one of the first routine and the second routine just prior to causing the data processing system to enter a different state.

6. A data processing system as claimed in claim 4, further comprising:
    a CMOS memory; and
    a dedicated power supply for the CMOS memory,
    wherein data corresponding to a current state of the data processing system is stored in the CMOS memory which maintains the data corresponding to the current irrespective as to whether or not power is supplied to a main power supply of the data processing system.

7. A data processing system as claimed in claim 1, wherein the controller comprises at least one of a BIOS of the data processing system and a power management control method.

8. A data processing system as claimed in claim 1, wherein the controller is operable to influence the state of the indicator after completion of a POST.

9. A data processing system as claimed in claim 1, wherein the controller has means to influence the state of the indicator during a shut-down procedure for the data processing system.

10. A data processing system as claimed in claim 1, wherein the state provides an indication that it is unsafe to maintain the data processing system.

11. A data processing system as claimed in claim 1, wherein the indicator comprises a bi-stable LCD.

12. A method for maintaining a data processing system as claimed in claim 1, the method comprising the steps of:
    determining from the indicator that it is unsafe to maintain the data processing system;
    powering up the data processing system; and
    performing a clean shut-down of the data processing system before commencing any maintenance.

13. A data processing system comprising:
    an indicator that provides an indication of whether or not it is safe to perform maintenance on the data processing system; the indicator being arranged to retain the state in the absence of power being supplied in the data processing system; and
    a controller arranged to set the state of the indicator according to whether or not it is safe to perform maintenance on the data processing system,
    wherein the state provides an indication as to whether or not it is safe to make a hardware change to the data processing system without requiring a full power-off and then full power-on of the data processing system, and
    wherein all possible states corresponding to when power is being supplied to the data processing system are indicated as unsafe states for performing maintenance on the data processing system.

* * * * *